United States Patent [19]

Coote et al.

[11] Patent Number: 4,744,527
[45] Date of Patent: May 17, 1988

[54] FILM CASSETTE

[75] Inventors: Jack H. Coote, Rochford; George F. A. M. Turner, Ingatestone, both of England

[73] Assignee: Ciba-Geigy AG, Basel, Switzerland

[21] Appl. No.: 13,891

[22] Filed: Feb. 11, 1987

[30] Foreign Application Priority Data

Feb. 11, 1986 [GB] United Kingdom ............... 8603253

[51] Int. Cl.⁴ .............................................. G03B 17/26
[52] U.S. Cl. ..................................... 242/711; 354/275
[58] Field of Search ............... 242/71.1; 206/389, 409, 206/408; 354/277, 275

[56] References Cited

U.S. PATENT DOCUMENTS

| | | | |
|---|---|---|---|
| 2,213,776 | 9/1940 | Walter | 242/71.1 |
| 3,043,534 | 7/1962 | Hejnochowicz | 242/71.1 |
| 3,147,681 | 9/1964 | Sanderson | 242/71 |
| 4,113,192 | 9/1978 | Oganai | 242/71.1 X |
| 4,482,232 | 11/1984 | Engelsmann et al. | 242/71.1 X |

FOREIGN PATENT DOCUMENTS

| | | |
|---|---|---|
| 850689 | 7/1952 | Fed. Rep. of Germany ..... 242/71.1 |
| 1082488 | 11/1964 | United Kingdom . |
| 1458819 | 5/1973 | United Kingdom . |

Primary Examiner—Stuart S. Levy
Assistant Examiner—Lynn M. Sohacki
Attorney, Agent, or Firm—Burns, Doane, Swecker & Mathis

[57] ABSTRACT

A cassette which is adapted to contain a length of photographic film wound on a spool and which has an exit-slot from which the film is pulled from the cassette being characterized in that it comprises a scroll control chamber which is formed from a strip of light opague resilient material of such dimensions that it fits into the cassette and is retained therein by means in the cassette, the width of the greater part of the strip being such that it is disabled by means at each end of the cassette from touching the inside wall of the cassette and the width of the lesser part of the strip being such that the end of this part of the strip abuts the inside wall of the cassette, the scroll control chamber being so located in the cassette that it is able to accommodate a length of photographic film wound on a spool, the leading end of the film being led from the spool through the lengthwise gap in the scroll control chamber, then passing between the inside wall of the cassette and the outer wall of that part of the scroll control chamber of greater width to the exit slot of the cassette.

6 Claims, 4 Drawing Sheets

FILM CASSETTE

BACKGROUND OF THE INVENTION

This invention relates to film cassettes.

The modern automatic camera comprises a large number of features which require a battery to operate them. Of these the feature which requires the most power is the automatic winding of the film out of the cassette, a frame at a time. To pull a frames' length of film out of the cassette it is required to overcome considerable frictional inertia and this is a heavy drain on the battery. In fact, often an automatic camera is rendered inoperable in the middle of exposing a length of film as the battery has become used up and usually there is no manual film drive mechanism. Thus, in order to reduce the drain on a battery in an automatic camera it would be advantageous to reduce the inertial friction encountered when winding the film out of the cassette.

It is thought that the three main causes of the friction encountered when winding a film out of a cassette are:

(a) the friction caused by pulling the film past the velvet light seals which form light sealing lips in the film exit slot of the cassette.

(b) the friction caused by separating the first turn of the coiled film in the cassette from the turn below it. When the coiled film is placed in the cassette it tends to clockspring outwards towards the internal wall of the cassette.

(c) the friction caused by overcoming the continual lobing of the film that forms in the area which leads to the exit slot. This lobing is also caused by the film clockspringing.

In the past, attempts have been made to provide cassettes which did not require velvet light sealing lips, for example the cassettes described in British patent specification Nos. 1082488 and 1458819. However in both these cassettes it appears that increased friction was encountered when the film was withdrawn past the light labyrinth. Further, some distortion of the film was also encountered. However it remains a very desirable object to provide velvet-less cassettes not only to reduce friction but also to avoid scratch marks on films as grit particles can easily be caught in the velvet pile and such particles cause a scratch mark on a film whenever the film is pulled past them. Further the placing and adhering of the two pieces of velvet in the slot is cumbersome and involves the use of adhesive which sometimes becomes transferred to the other parts of the cassette.

SUMMARY OF THE INVENTION

It is the object of the present invention to provide a cassette for coiled films on a spool which does not require velvet light seals and in which the friction involved in pulling the film out of the cassette is greatly reduced.

According to the present invention, in a cassette which is adapted to contain a length of photographic film wound on a spool and which has an exit-slot from which the film is pulled from the cassette the provision of a scroll control chamber which is formed from a strip of light opaque resilient material of such dimensions that it fits into the cassette and is retained therein by means in the cassette, the width of the greater part of the strip being such that it is disabled by means at each end of the cassette from touching the inside wall of the cassette, and the width of the lesser part of the strip being such that the end of this part of the strip abuts the inside wall of the cassette, the scroll control chamber being so located in the cassette that it is able to accommodate a length of photographic film wound on a spool, the leading end of the film being led from the spool through the lengthwise gap in the scroll control chamber, then passing between the inside wall of the cassette and the outer wall of that part of the scroll control chamber of greater width to the exit slot of the cassette.

By the scroll control chamber being made of resilient material, is meant that the strip has been formed into a chamber which when compressed tends to return to its former shape.

It is to be understood that when a strip of film is wound, turn-upon-turn it forms a scroll not a cylinder.

Thus, by scroll control chamber is meant a chamber which is able to hold a coil of strip material in the coiled or scrolled state and which has a lengthwise gap through which the leading edge of the coiled material protrudes to enable the coiled material to be unwound from the coil. To enable the coiled material to be led out easily, the container on one side of the lengthwise gap protrudes out further from the axial centre of the chamber to accommodate the end of the top turn of wound material.

Thus in the cassette of the present invention, the scroll control chamber acts as a light trap and also limits the coils of wound film from clockspringing against the inside wall of the cassette. Thus the need to provide velvet light sealing lips is obviated. Further, the friction encountered when pulling the strip of film out of the cassette, frame-by-frame, is reduced by the removal of the velvet light sealing lips and by limiting the coils of film from clockspringing against the inside wall of the cassette or lobing at the exit slot.

The cassette of the present invention is of most use as a 35mm cassette for photographic film material and its use in this connection will be described with reference to the accompanying drawings, but a cassette as hereinbefore set forth could be used with any other width of film material such as 16 mm or 70 mm.

Preferably the material of construction of the scroll control chamber is a strip of thin metal, for example stainless steel or hard aluminum, as such metals are readily formed into scroll control chambers of the required shape and are also resilient. By thin in this context is meant between 0.1 and 0.5 mm. A convenient thickness is 0.2 mm for the gauge of metal. However, it is possible to form the scroll control chamber from treated metal which has a friction reduced surface.

Also, it is possible to form the scroll control chamber from a strong resilient plastic material which is light opaque, for example, carbon filled polystyrene.

The thickness of the strip of plastic material from which the scroll control chamber is prepared, can also be between 0.1 and 0.5 mm with a convenient thickness being 0.2 mm. In one preferred embodiment, the end of the greater part of the strip which is of such a width that it is disabled by means at each end of the cassette from touching the inside wall of the cassette tapers down to a thin flexible end. For example it tapers down to 0.025 mm at the very end of the strip. This tapered end of the scroll chamber may be weakened to obtain greater flexibility at the extreme end, by introducing corrugations or grooves on the inside surface of the scroll chamber. In this preferred embodiment, any spool used in the cassette must have the diameter of its flanges reduced.

This is to enable the end of the scroll control chamber to bend inwards when the very end of the film wound on the spool is lead into the passage between the outer wall of the scroll control chamber and the inner wall of the cassette. This inward flexing of the end of the scroll control chamber allows a curved exit path for all the film length lead off the central spool in the cassette and thus reduces the pull required to lead off the last few turns of film.

Most 35 mm cassettes now in use have two end caps which are press-fitted over the two ends of the cassette body. The ends of the cassette usually have a groove into which the flange on the end cap fits. The radial distance between the inside wall of the cassette and the point where the inwardly formed grooves at the ends of the cassette are closest to the centre of the cassette is most usually greater than the thickness of the film strip. Thus conveniently, the width of the strip of resilient material from which the scroll control chamber is formed along its greater part is just greater than the axial distance between the two grooved areas at each end of the cassette, but shorter than the distance between the two end caps. This enables the scroll control chamber to fit into the cassette pressing against the bottom of the grooves. Thus, around the greater part of the periphery of the scroll control chamber each end of the scroll control chamber presses against the bottom of the grooves and this prevents the scroll control chamber from abuting the internal wall of the cassette along this greater length. It also provides a passage for the strip of film material between the inside wall of the cassette and the outside wall of the scroll control chamber.

However, the width of the lesser part of the strip from which the scroll control chamber is formed is such that it is less than the distance between the two grooves at each end of the cassette. Thus, the resilience of the material of construction of the scroll control chamber forces the end of the scroll control chamber at its lesser width to abut the inside wall of the cassette.

The cassette of the present invention can also be a staked cassette, but in this case the cassette body should be formed with a step in it to provide a passage between the internal wall of the cassette and the external wall of the scroll control chamber as without the step the scroll control chamber would be fixed adjacent to the cassette body by the end cap staked on to the cassette body.

However in this case no other means are required to retain the scroll control chamber in the cassette as the staking will do this. However, in the case of a cassette with press on end caps further means are required to retain the scroll control chamber in the current position. This retention can easily be achieved by providing at least one location abutment member on the outside surface of the scroll control chamber which locates with an indent member on the inside surface of the cassette.

Conveniently, the strip from which the scroll control chamber is formed is of greater width from 0.55 to 0.8 of its length and most conveniently 0.66 of its length.

Conveniently, the strip from which the scroll control chamber is formed is stepped down from the greater width to the lesser width, but it can be gradually decreased to the lesser width.

Conveniently, when the scroll control chamber is present in the cassette the lengthwise gap in the scroll control chamber is about 3 to 4 mm. A narrower gap makes it less easy to pull out the strip of film from the scroll control chamber whilst a much wider gap could cause lobing of the film at this gap.

BRIEF DESCRIPTION OF THE DRAWINGS

The accompanying drawings will serve to illustrate the invention.

DESCRIPTION OF THE PREFERRED EMBODIMENT

In all the figures the same numbers have the same signification.

Figure 1:
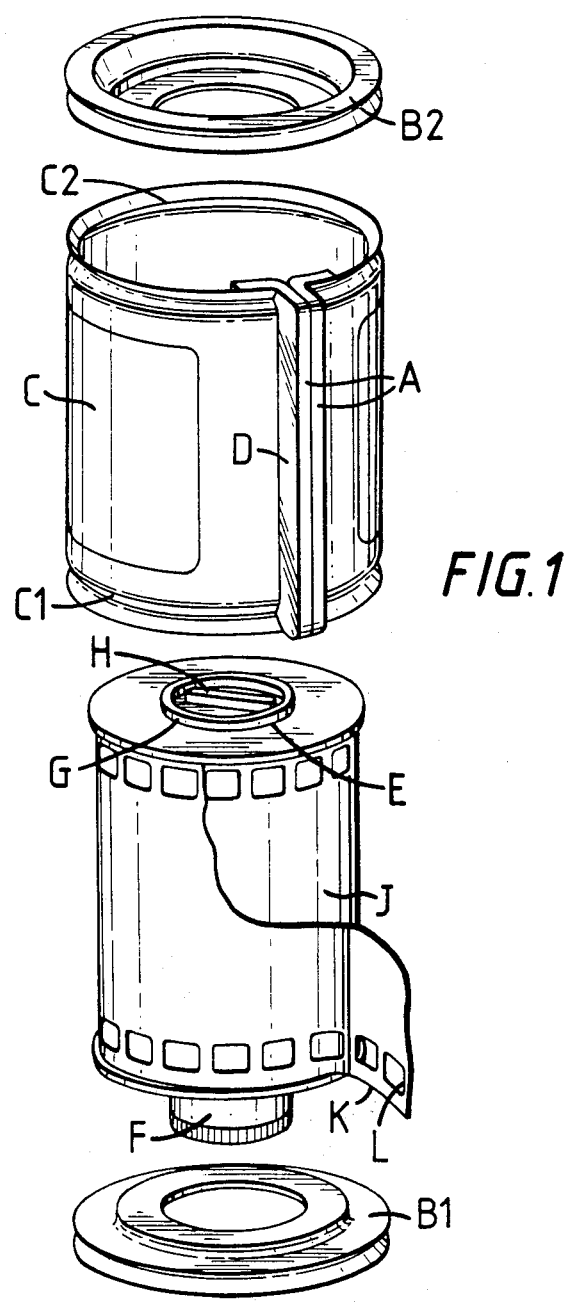
FIG. 1 is an exploded side view of a normal 35 mm film cassette with a film wound on a spool.

Referring now to FIG. 1 there is shown a normal 35 mm film cassette which comprises two annular end caps B1 and B2 and a substantially cylindrical cassette body C having a light-tight, longitudinally extending film exit slot D which is formed by pinching together the two ends of a metal strip from which the cassette body C is formed.

The two strips of velvet A which form the light seal are shown.

The cassette body is intended to hold film J wound on to a flanged spool E which has a long hub end F and short hub end G. The film J has a leading end K and conventional sprocket holes L.

Figure 2:
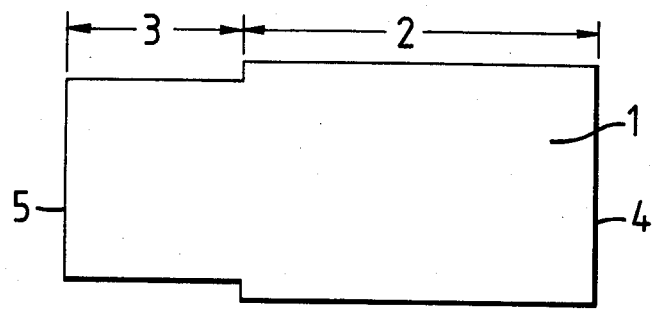
FIG. 2 shows a strip of metal from which a scroll control chamber can be formed.

In FIG. 2 is shown a strip of thin metal 1, the length 2 is of greater width than the length 3. In fact length 2 is ⅔ of the length of the strip 1.

The end of length 2 is end 4 and the end of length 3 is end 5.

Figure 3:
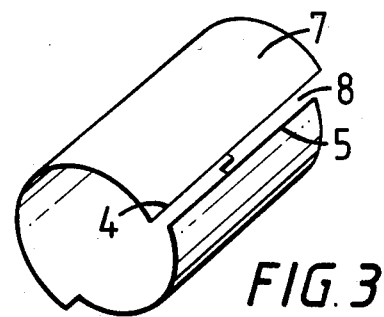
FIG. 3 is a perspective view of a scroll control chamber made from the strip of FIG. 2.

In FIG. 3 the strip 1 has been formed into a scroll control chamber 7. The peripheral length of chamber 7 is such as to fit into the cassette C and leave a lengthwise gap 8 of 3 mm when in position in the cassette.

Figure 4:
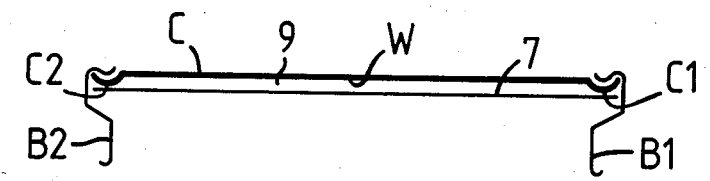
FIG. 4 is a cross-sectional axial view of part of a cassette according to the present invention.

FIG. 4 shows part of the cassette C with the two end caps B1 and B2 in position. These end caps fit into the grooves C1 and C2 formed at each end of the cassette body C.

As can be seen in FIG. 1 and in FIG. 4 the bottom of each groove C1 and C2 are closer to the centre of the cassette body C than the wall of the cassette body W.

The scroll control chamber 7 is shown located against the bottom of the two grooves C1 and C2. This leaves a gap 9 between the wall W of the cassette and the scroll control chamber 7 which is sufficient to allow the passage of film strip J therebetween.

Figure 5:
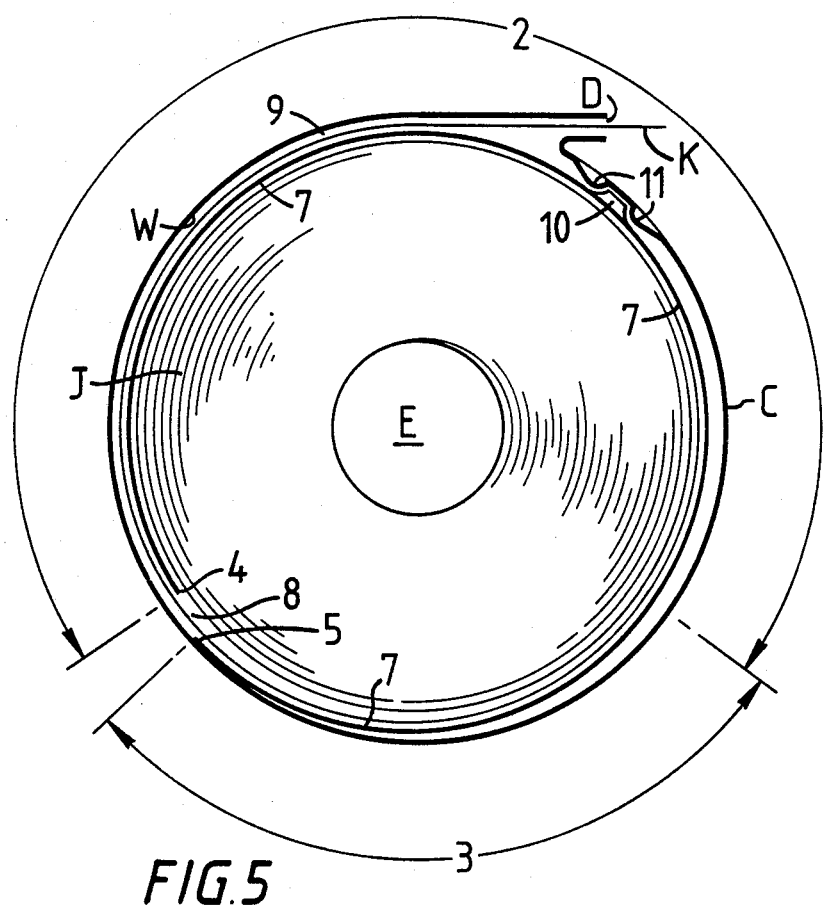
FIG. 5 is a cross-sectional diametrical view of a loaded cassette according to the present invention.

FIG. 5 is a cross-sectional view of a loaded cassette according to the present invention.

The cassette body C and the exit slot D are shown. Inside the body C is the scroll control chamber 7. Inside the scroll control chamber 7 is a length of film J loaded on a spool E. The leading edge of the film K is shown in slot D.

The length 2 of scroll control chamber 7 is shown distanced from the wall W of the cassette C. This is because length 2 is held away from the wall W by the bottom of the grooves C1 and C2 as shown in FIG. 4. However, the end 5 of the scroll control chamber 7 is shown abutting the wall W. This is because length 3 of the scroll control chamber 7, which is narrower in width than length 2, is not held by the bottom of the grooves C1 and C2 and the resilience of the metal from which the scroll control chamber 7 is formed causes the end 5 to press against the wall W.

Present on the outside of scroll control chamber 7 is a raised or abutment member 10. This member 10 locates in an indent member 11 formed on the inside of the wall W of the cassette body C. Members 10 and 11, when interlocked, locate the scroll control chamber 7 correctly in the cassette C and limit its' movement when film is pulled out of the cassette.

As shown in FIG. 5 the film strip is held as a scroll in the scroll control chamber 7. The cassette is loaded so that the leading end of the film K protrudes out of the slot D and the film is lead between the wall W and the top outside wall of the scroll control chamber 7 then through the gap 8. The coiled film on the spool is then placed inside the scroll control chamber 7 where it is held as a scroll.

The passage between the internal wall W of the cassette and the scroll control chamber 7 acts as a very efficient light labyrinth and limits light from reaching the film as it is enclosed in the scroll control chamber. A small length of film will be fogged as there is no velvet to keep all light from entering the cassette. But the length of film which will be fogged is the length which is not used to record negatives as it is used to thread over the exposure position to the take-up spool even in autowind cameras.

Further, as the scroll control chamber limits any clockspringing of the coiled film either against the internal wall of the cassette or lobing in the area of the exit slot, the friction required to be overcome when pulling out the film frame-by-frame is very much reduced.

The fact that the film is drawn off the spool as a scroll allows air to be present between the top-most turn of film and the second turn. This further reduces the friction. This air is used to lubricate the outside surface of scroll control chamber where the film is drawn over it as the camera is wound, and it is this action that obviates the "capstan" effect. The near scroll-like shape of the chamber is shown by the fact that end 5 of the chamber is further away from the centre of the cassette than is end 4 of the chamber.

Figure 6:
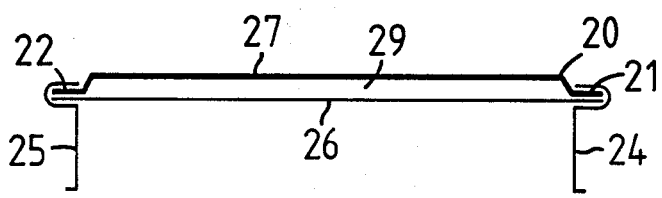
FIG. 6 is a cross-sectional axial view of part of a staked cassette according to the present invention.

In FIG. 6 is shown a staked end cap cassette. This comprises a cassette body 20 having ends 21 and 22. Two end caps 24 and 25 and a scroll control chamber 26. The cassette body 20 is stepped out at 27 to provide a passage 29 between the scroll control chamber 26 and the cassette body. Flanges on the end caps 24 and 25 are pressed or staked to grip tightly the ends 21 and 22 of the cassette body and also the ends of the scroll control chamber 26.

Figure 7:
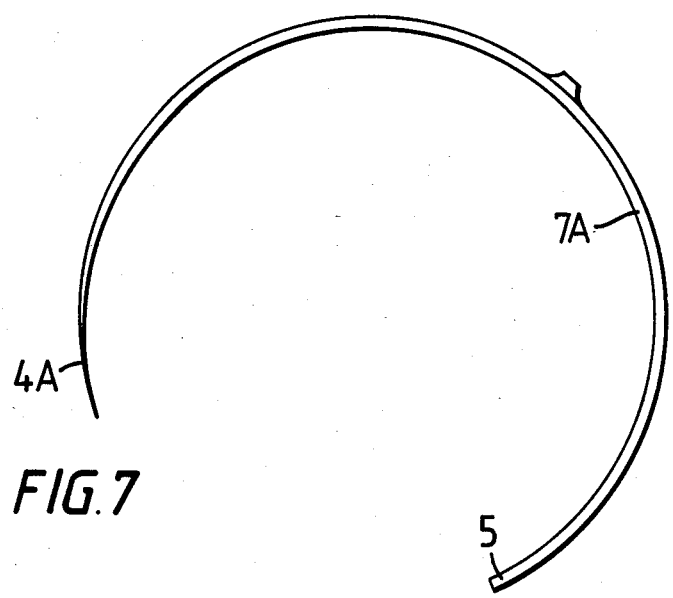
FIG. 7 is a cross-sectional diametrical view of a scroll chamber with a tapered end.

In FIG. 7 there is shown a modified scroll control chamber 7A. End 5 of this chamber is the same thickness as that of end 5 in FIG. 5 but end 4A is of a reduced thickness to make this end flexible.

Figure 8:
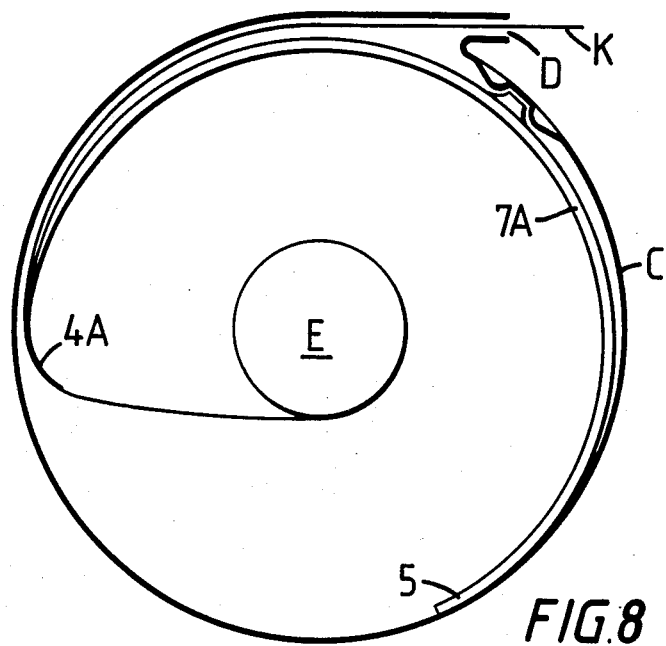
FIG. 8 shows the modified scroll chamber of FIG. 7 in a loaded cassette with the last turns of film being led off the spool.

In FIG. 8 the scroll chamber 7A of FIG. 7 is shown in the loaded cassette of FIG. 5 having replaced the scroll chamber 7. The last few turns of film on the spool E are being wound off and thus are bending the end 4A of the scroll chamber 7A. This flexing of the end 4A allows a curved exit path for all the film lead off the central spool E and thus reduces the pull required to lead off the last few turns of film on the spool.

We claim:

1. A cassette formed by a tubular wall and opposed end caps attached thereto, said cassette adapted to contain a length of photographic film wound on a spool and which has an exit-slot from which the film is pulled from the cassette, the cassette including a scroll control chamber therein which is formed from a continuous strip of light opaque resilient material having first and second portions of first and second widths, respectively, said first width being greater than said second width, and having first and second lengths, respectively, said first length being greater than said second length, said first portion being positioned by interlocking means in the cassette, said first portion being such that it is disabled by said end caps from touching an inside wall of the cassette, and said second portion having an end resiliently abutting the inside wall of the cassette and defining a slot with an opposed end of said first portion, the scroll control chamber being so located in the cassette that it is able to acommodate a length of photographic film wound on a spool, a leading end of the film being led from the spool through said slot, then passing between the inside wall of the cassette and an outer wall of the first portion of the strip to said exit-slot.

2. A cassette according to claim 1 wherein the material of construction of the scroll control chamber is hard aluminum having a thickness of between about 0.1 and about 0.5 mm.

3. A cassette according to claim 1 wherein the material of construction of the scroll control chamber is a strip of plastic material having a thickness of between about 0.1 and about 0.5 mm and the first portion of the strip tapers down to a thickness of about 0.025 mm.

4. A cassette according to claim 1 wherein the first portion of the strip from which the scroll control chamber is made has a length of from about 0.55 to about 0.8 of the length of said first and second portions of said strip.

5. A cassette according to claim 1 wherein the material of construction of the scroll control chamber is stainless steel having a thickness of between about 0.1 and about 0.5 mm.

6. A cassette according to claim 3 wherein the first portion of the strip from which the scroll control chamber is made has a length of from about 0.55 to about 0.8 of the length of said first and second portions of said strip.

* * * * *